(12) United States Patent
Long et al.

(10) Patent No.: US 7,676,494 B2
(45) Date of Patent: Mar. 9, 2010

(54) SYSTEM AND METHOD OF MATCHING VEHICLE RATINGS USING A CENTRAL DATABASE

(75) Inventors: Mark C. Long, Tempe, AZ (US); David M. Dilgard, Phoenix, AZ (US); Eric L. Bierman, Glendale, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 1504 days.

(21) Appl. No.: 10/674,934

(22) Filed: Sep. 29, 2003

(65) Prior Publication Data

US 2005/0071373 A1 Mar. 31, 2005

(51) Int. Cl.
*G06F 17/30* (2006.01)
(52) U.S. Cl. .................................. 707/104.1; 707/3
(58) Field of Classification Search .................. 705/26; 701/29, 214; 707/104.1, 3
See application file for complete search history.

(56) References Cited

U.S. PATENT DOCUMENTS

| 6,389,337 | B1 * | 5/2002 | Kolls | 701/29 |
| 2001/0018639 | A1 * | 8/2001 | Bunn | 701/214 |
| 2002/0002551 | A1 * | 1/2002 | Dears | 707/3 |
| 2005/0261986 | A1 * | 11/2005 | Haynes et al. | 705/26 |

* cited by examiner

*Primary Examiner*—John E Breene
*Assistant Examiner*—Dennis Myint
(74) *Attorney, Agent, or Firm*—Rowan P. Smith; Quarles & Brady LLP (57) ABSTRACT

A computer reservation system matches vehicle ratings using a central database. Vehicle information and rental equipment information are stored in the central database. A user specifies a vehicle description including make, model, and year of the vehicle on a website. The central database is searched based on the vehicle description to find related vehicle information including physical characteristics of the vehicle. The rental equipment in the central database is identified which is compatible with the vehicle as determined by a comparison of the rental equipment information to the vehicle information. The physical characteristics of the vehicle are compared to physical characteristics of the rental equipment to determine compatibility between the vehicle and the rental equipment. The compatible rental equipment is displayed on the website for the user.

31 Claims, 4 Drawing Sheets

VEHICLE DOING THE TOWING
- YEAR ▼ — 50
- MAKE ▼ — 52
- MODEL ▼ — 54
- ENGINE ▼ — 56
- HITCH ▼ — 58

VEHICLE TO BE TOWED
- YEAR ▼ — 60
- MAKE ▼ — 62
- MODEL ▼ — 64

FIG. 5

RENTAL TRUCK
- SMALL TRUCK ▼ — 70
- MEDIUM TRUCK ▼ — 72
- LARGE TRUCK ▼ — 74

VEHICLE TO BE TOWED
- YEAR ▼ — 76
- MAKE ▼ — 78
- MODEL ▼ — 80

FIG. 6

SYSTEM AND METHOD OF MATCHING VEHICLE RATINGS USING A CENTRAL DATABASE

FIELD OF THE INVENTION

The present invention relates in general to computer reservation systems and, more particularly, to a system and method of matching vehicle ratings to rental equipment using a central database.

BACKGROUND OF THE INVENTION

Many businesses provide reservation services for customers to schedule the rental or use of goods and services offered by the business. The travel industry uses reservations to schedule airline flights, hotels, and rental cars. The moving and storage industry uses reservation services to arrange for rental and use of trucks and trailers for moving, equipment for loading and unloading, and storage units for holding customer belongs. In the self-serve moving and storage business, a customer may reserve a certain size truck or trailer and any needed moving equipment and supplies for some number of days. By making a reservation, the customer can plan the move and pick up the truck or trailer on the scheduled day with reasonable certainty that everything will be available and operational.

With the wide availability of computer communications and the use of the internet many businesses make reservations available on company websites. For example, a customer needing to reserve a rental truck may visit a truck rental company website and find a user-friendly, menu-driven webpage designed to simplify the reservation process. The webpage will include descriptions and pictures of goods and services offered by the truck rental company, alternatives and advise to assist the customer, and pricing information, all designed to make the reservation and rental process as smooth, convenient, and efficient as possible. The customer makes the reservation by entering basic information such as name, address, telephone number, email address, selection of rental equipment and supplies, pick-up location and time, drop-off location and time, and credit card number.

The customer has many choices in reserving rental equipment. One of the more common reservation requests made to the truck rental company is to rent a truck and/or trailer for moving customer belongings. Sometimes the customer wants to reserve a rental truck to tow the customer's trailer. Sometimes the customer wants to reserve a rental trailer to be towed by the customer's vehicle. The customer may want to reserve both the rental truck and rental trailer in support of the planned move. The customer may already have the truck and trailer and simply need moving supplies and towing advice.

In selecting the rental equipment from the truck company website, the customer may have a good idea of the moving task at hand and the available budget and selects a certain size and capacity truck and/or trailer accordingly. However, the truck rental company generally has very little insight into the customer's moving plans. Moreover, the customer does not always convey all information to the truck rental company which is material and relevant for a trouble-free rental experience. For example, the customer may reserve a small truck without disclosing the fact that the rental truck will be used to tow a large customer trailer. For the customer, price may be the primary consideration. If the rental truck is under-rated to tow the customer's trailer, the customer can experience problems in route. Alternatively, the customer may rent a large trailer and arrive to pick up the rental trailer with an under-rated vehicle. Depending on the circumstances, the truck rental company technician may be compelled to look-up customer vehicle ratings and possibly deny the rental based on safety and liability issues. Compatibility issues between the tow vehicle and the vehicle to be towed are either not addressed or are only considered at the time that the rental equipment is picked up, which is a difficult time to bring up problems.

One type of rental trailer used to tow customer vehicles is known as a tow dolly or auto transport. The tow dolly is the two wheel version where the back wheels of the customer's vehicle being towed run on the road. The auto transport is the four wheel version which supports the entire customer vehicle to be towed. There are prior experiences and issues, known to the truck rental company, with using tow dollies and auto transports. For example, certain vehicles are known to scrape bottom when loading onto the tow dolly. Other vehicles cannot open their doors without banging the sides when loaded on the auto transport. The customer may become irritated if these issues are not disclosed up front, especially if actual or perceived damage ensues.

Even if the reservation agent makes inquiries regarding the customer's vehicle and/or trailer and moving intentions, the customer may not understand the questions or know the requested information. The reservation agent may not be able to translate the customer's answers into further questions to determine whether the overall moving plan is viable. The truck rental company can lose sales because the reservation agent and customer have difficulty communicating and cannot reach accord.

SUMMARY OF THE INVENTION

In one embodiment, the present invention is a method of matching vehicle ratings to rental equipment using a central database, comprising the steps of storing vehicle information and rental equipment information in the central database, providing a website for a user to specify a description of a vehicle, searching the central database based on the description of the vehicle to find related vehicle information, identifying rental equipment in the central database which is compatible with the vehicle by a comparison of the rental equipment information to the vehicle information, and displaying the compatible rental equipment on the website.

In another embodiment, the present invention is a method of matching vehicle information to equipment comprising the steps of receiving a description of a vehicle from a user, searching a central database based on the description of the vehicle to find related vehicle information, identifying equipment in the central database which is compatible with the vehicle by a comparison of the equipment to the vehicle information, and sending a listing of the compatible equipment to the user.

DETAILED DESCRIPTION OF THE DRAWINGS

Figure 1:
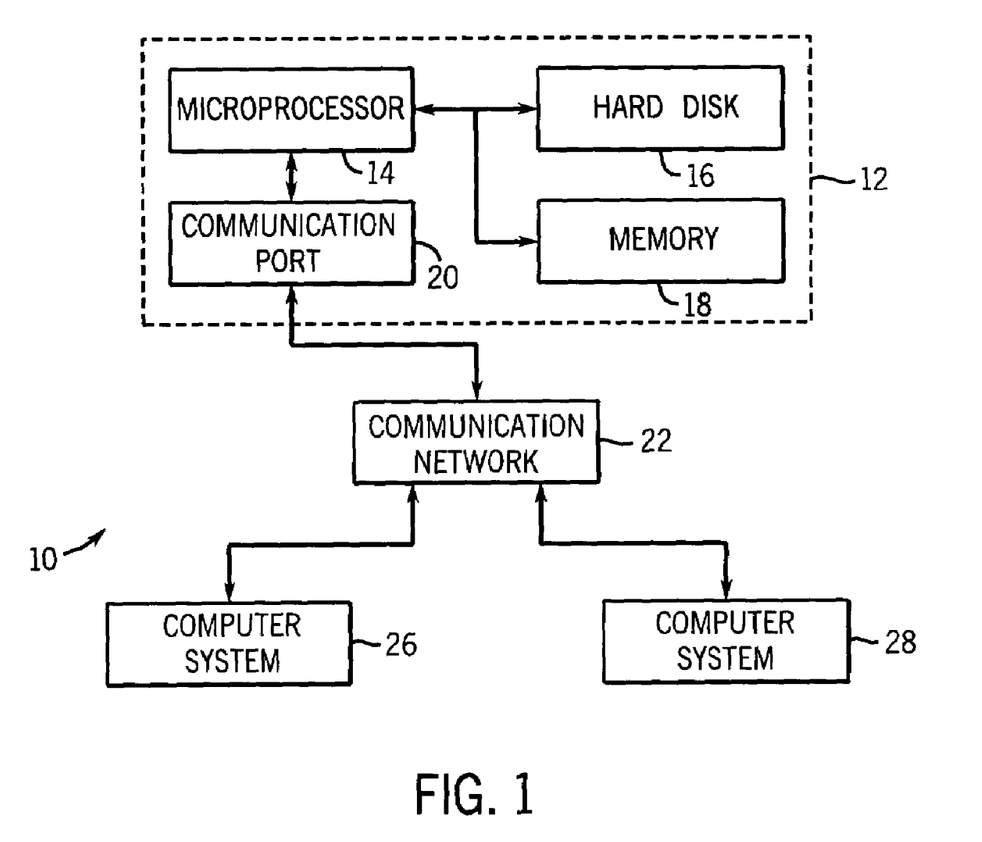
FIG. 1 is a block diagram of a computer network system used to host and access an internet-based website.

A computer system and network 10 is shown in FIG. 1 used to host and access an internet-based website. Computer system 12 is a general purpose computer including a central processing unit or microprocessor 14, mass storage device or hard disk 16, electronic memory 18, and communication port 20. Communication port 20 may be a high speed Ethernet connection to communication network 22. Communication network 22 is an open architecture system such as the world wide web, commonly known as the internet. Computer system 26 and computer system 28 are configured as shown for computer 12 and are also connected to communication network 22, which allows communication between computers 12, 26, and 28.

Computers 12, 26, and 28 can be physically located in any location with access to a modem or communication link to network 22. For example, computer 12 can be a central server at a company's home office. Computers 26 and 28 can be located in an office or personal residence.

With the wide availability of computer communications and the use of the internet many businesses make reservations available on company websites. In the present case, computer 12 runs application software which can be used to host one or more websites. Each website includes one or more webpages providing information and receiving information. Certain information to be displayed on each website is stored on a central database or flat file on hard disk 16, or other mass storage device or distributed mass storage accessible to computer 12. Users operating computers 26 and 28 from any location can, via communication network 22, log into the website hosted by computer 12 to view information and provide information on the website. The database on hard disk 16 is organized so that users on computers 26 and 28 can access the same information on a central source, even though the central source may be part of a distributed system.

In the present embodiment, a truck rental company operates a website on computer 12 to offer truck and trailer rentals and moving and storage services for residential and business customers. A customer needing to reserve a rental truck and/or trailer visits the truck rental website and finds user-friendly, menu-driven webpages designed to simplify the reservation process. The truck rental website uses application software and computer programs running on a general purpose computer with associated microprocessor, memory, hard disk storage, and communication links such as shown in FIG. 1. The application software is loaded on computer 12 from a CD or downloaded from a commercial website. To access the truck rental website, the customer types in its uniform resource locator (URL) address, or enters the website from a search engine hyperlink. The webpage will include descriptions and pictures of goods and services offered by the truck rental company, alternatives and advise to assist the customer, and pricing information, all designed to make the reservation and rental process as smooth, convenient, and efficient as possible. Once in the website, the customer browses the available goods and services offered by the truck rental company. If the customer wants to rent or purchase goods and services offered by the truck rental company on the website, the customer makes his or her selections of rental equipment and supplies, specifies pick-up and drop-off location and time, and enters personal information to complete the transaction. The personal information includes name, billing address, shipping address, telephone number, email address, credit card number, and special instructions.

The organization of the website can take many forms and hierarchical structures. Some websites pack as much information and as many hyperlinks as possible into the first webpage under the theory that if the customer cannot find what he or she wants at first glance, then they will move on to another website. Other websites have a first webpage that is clean and simple and count on the customer providing some preliminary information to identify the area of interest before moving to secondary or lower level webpages.

FIGS. 2-5 illustrates a simplified view of a few webpages providing information and the ability to make selections on the truck rental website. An actual commercial website will include much more in the way of graphics, drawings, text, marketing, color, and appeal. The hierarchical structure of the truck rental website is organized by design choice.

Figure 2:
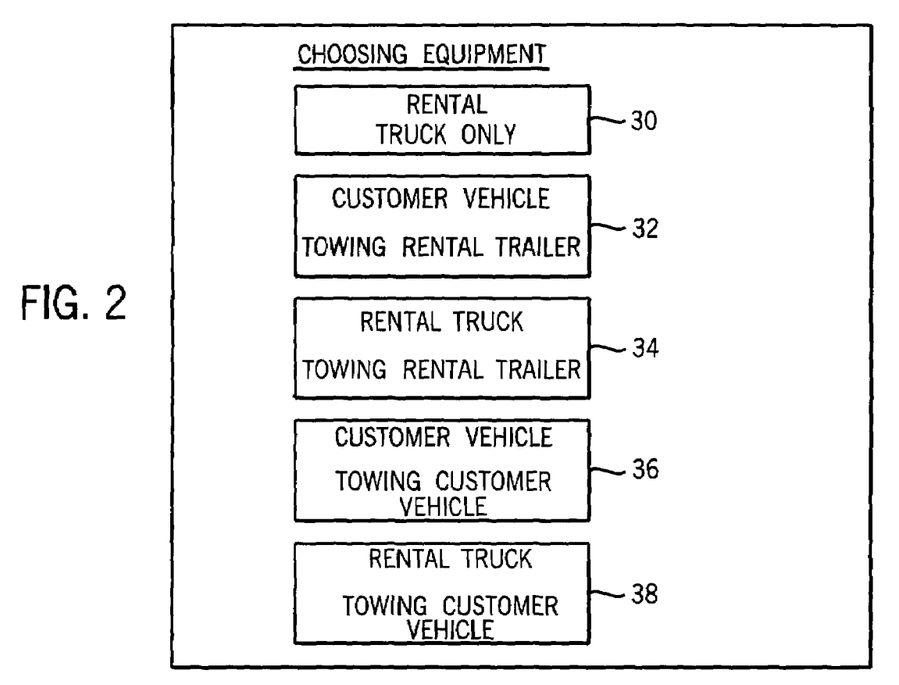
FIG. 2 illustrates a webpage for selecting various truck and trailer combinations.

The truck rental website includes a home webpage, such as shown in FIG. 2, offering different truck and trailer combinations, rates and reservations, and locations of dealerships. Each webpage may also include other hyperlinks to moving related information, advice, supplies, recommendations, specials, equipment guides, and banner ads. The home webpage is organized to select one of several truck/trailer combinations. The combinations include rental truck only in box 30, customer vehicle towing rental trailer in box 32, rental truck towing rental trailer in box 34, customer vehicle towing customer vehicle in box 36, and rental truck towing customer vehicle 38. The truck and/or trailer combination is selected by clicking the associated box.

Selecting rental truck only in box 30 displays a webpage with all rental trucks offered by the truck rental company. The customer selects the desired rental truck according to their moving needs and budget. The rental truck only webpage may include a confirmation box stating that the customer does not intend to tow a trailer. The truck rental company can use this information and disclaimer if the customer calls in with trailering problems.

Figure 3:
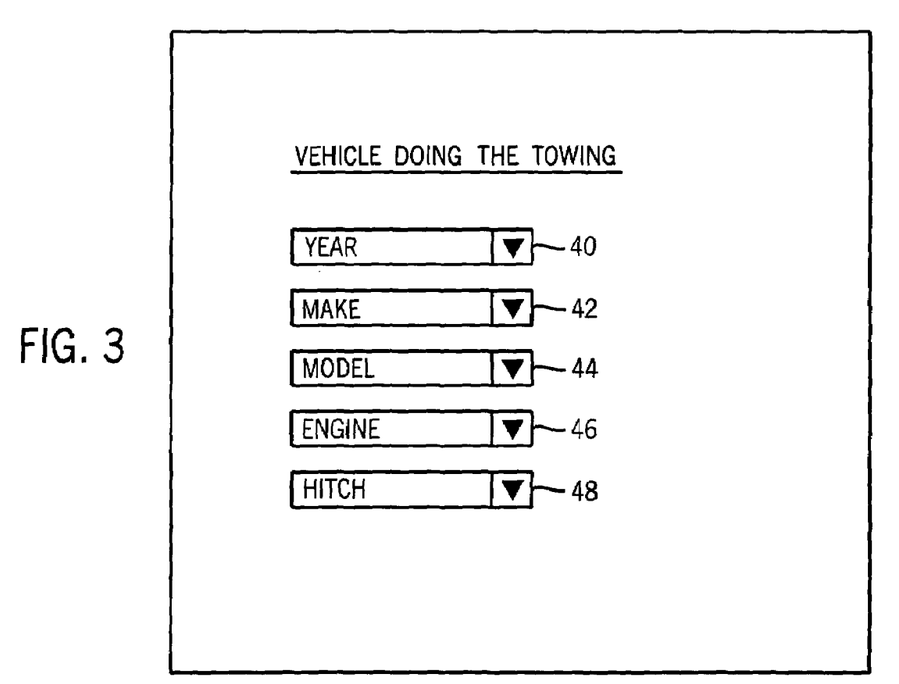
FIG. 3 illustrates a webpage for matching a customer vehicle towing a rental trailer.

Selecting customer vehicle with rental trailer in box 32 displays a webpage, as shown in FIG. 3, where the customer enters a basic vehicle description about the vehicle doing the towing. The customer vehicle towing rental truck webpage provides pull-down windows for year in box 40, make in box 42, model in box 44, engine in box 46, and hitch rating in box 48 of the customer vehicle. The pull-down menus provide common and known choices to simplify the selection process and improve the selection data accuracy and integrity. The customer provided vehicle information is sent to computer 12 over communication network 22. The application software running on computer 12 searches the central database for the customer's vehicle information. The database stores a comprehensive depository of vehicle information such as weight, width, height, ground clearance, engine size, drive configuration (2-wheel or 4-wheel drive), towing capacity, door clearance, and other physical characteristics of the vehicle. The database further stores a comprehensive depository of similar information for the rental trucks and trailers offered by the truck rental company. The vehicle information and rental equipment contained in the central database is compiled by the truck rental company from a variety sources including the manufacturers, inspections, vehicle service providers, custom specifications, and experience in renting truck and trailers. In addition, the database contains advisories and footnotes related to the customer vehicle and rental equipment. Advisories and footnotes are information related to the subject vehicle and/or rental equipment that have been provided by the manufacturer or learned by truck rental company through day-to-day experience in renting truck and trailers and dealing with customer vehicles.

The application software running on computer 12 may request further information from the customer based on the vehicle information in the database. For example, the customer may have entered a certain make and model of pickup truck or sports utility vehicle (SUV). The database knows that the specified pickup truck or SUV comes with optional towing packages from the manufacturer. A pop-up window appears on computer 26 to allow the customer to provide additional requested vehicle information as derived and formulated from the database search of the first set of vehicle information. The pop-up window shows the known optional configurations for the customer to select from. If the customer does not know the requested additional vehicle information, the default condition selects the lowest rating.

There are a number of considerations when matching a customer vehicle to a rental trailer to ensure operational efficiency and safety. With all available customer vehicle information from the database, the software running on computer 12 conducts a search of the database looking for trailers available for rent by the truck rental company that are compatible with the customer's vehicle. The software considers a number of criteria when matching the customer vehicle to the rental trailer options. For example, the software analyzes the height of the customer vehicle and hitch assembly, length and width of the customer vehicle, electrical wiring harness, stabilizer bars, ground clearance, engine size, drive configuration, towing capacity, and other physical characteristics. Each rental trailer has known compatibility ranges that are matched to the characteristic of the customer vehicle. The rental trailer has a certain weight and requires a tow vehicle having at least a minimum weight. The rental trailer has a certain length and requires a tow vehicle having at least a minimum length. The rental trailer has a certain tongue arrangement and requires certain height and class of hitch on the customer vehicle. The common classes of hitches are class I, II, and III. The rental trailer may require the hitch to support stabilizer bars. The rental trailer will require a vehicle with a minimum towing capacity. Thus, the physical characteristics of the customer vehicle as retrieved from the central database are compared to the physical characteristics and requirements of the rental trailer also found in the central database to determine compatibility between the vehicle and the rental equipment.

Using the comprehensive vehicle and rental trailer information from the central database, the software on computer 12 validates customer vehicle information, as provided from the customer vehicle with rental truck webpage in FIG. 3, and matches to compatible rental trailers available from the truck rental company. The rental trailers which have been identified as being compatible with the customer vehicle are sent to computer 26 over communication network 22, including description, size, capacity, and price, and displayed as a list on computer 26 for the customer to select from. The customer selects the rental trailer from the list best suited to meet their needs and budget. In addition, the completed reservation information is sent to the local dealer for their records.

One of the advantages of matching vehicle ratings using a central database is that the truck rental company can maintain and update its depository of vehicle and trailer information on one system. The customer gets access to the latest information. The customer no longer needs to obtain on-site vehicle inspections or be faced with surprises when picking up the rental trailer. Computer 12 has thoroughly analyzed the customer's vehicle and based on the physical characteristics of each unit determined that the rental trailer is a good match to ensure that the customer experiences a trouble-free move.

Selecting rental truck with rental trailer in box 34 displays a webpage where the customer can select either a rental truck or rental trailer. If the customer selects a certain rental truck, the selection is sent to computer 12 where the application software searches the database for compatible rental trailers in a similar manner as described above for the customer vehicle towing rental trailer webpage. The central database contains detailed information on the rental trucks and rental trailers owned and operated by the truck rental company. If the customer selects a certain rental trailer, the selection is sent to computer 12 where the application software searches the database for compatible rental trucks. The database cross-references matches between rental trucks and rental trailers.

Using the comprehensive vehicle and trailer information from the central database, the software on computer 12 finds matches between the selected rental truck or trailer. The compatible rental trailers or truck, including description, size, capacity, and price, are displayed as a list on computer 26 for the customer to select from. The customer selects the rental equipment from the list best suited to meet their needs and budget.

Figure 4:
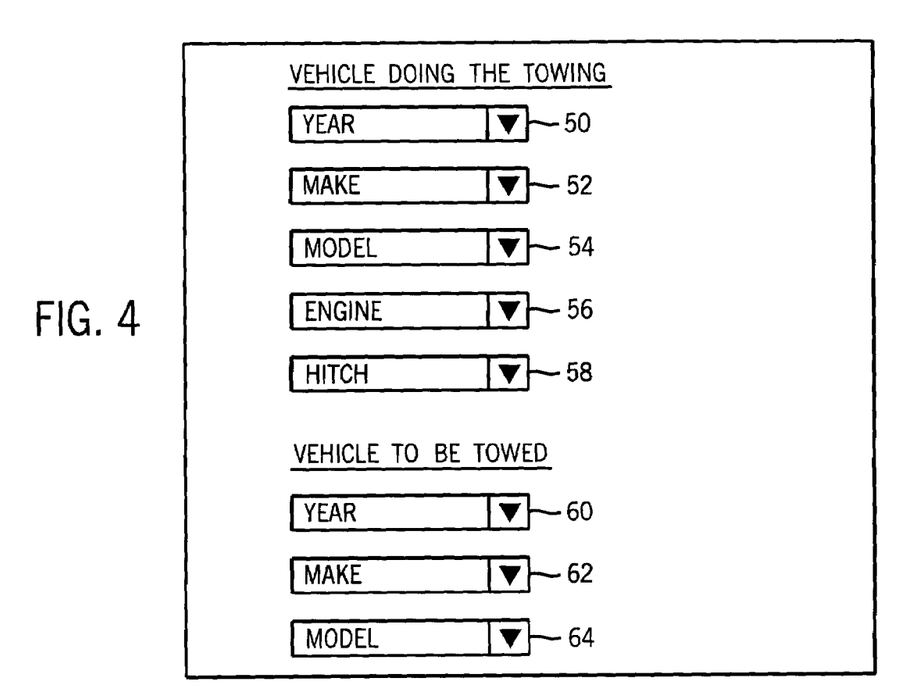
FIG. 4 illustrates a webpage for matching a customer vehicle towing another customer vehicle.

Selecting customer vehicle towing customer vehicle in box 36 displays a webpage, as shown in FIG. 4, where the customer enters a basic vehicle description about the vehicle doing the towing. The customer vehicle towing customer vehicle webpage provides pull-down windows for specifying year in box 50, make in box 52, model in box 54, engine in box 56, and hitch rating in box 58 of the customer vehicle. The customer further provides information about the vehicle to be towed such as year in box 60, make in box 62, and model in box 64. The vehicle information provided by the customer through the customer vehicle towing customer vehicle webpage is sent to computer 12 over communication network 22. The application software running on computer 12 searches the database for the customer's tow vehicle and vehicle to be towed. With the customer vehicle information from the database, the software running on computer 12 conducts a search of the database looking for tow dollies or auto transports trailers available for rent from the truck rental company that are compatible with the customer's tow vehicle and vehicle to be towed. The tow dolly is the two wheel version where the back wheels of the customer's vehicle being towed run on the road. The auto transport is the four wheel version which supports the entire customer vehicle to be towed.

The software on computer 12 evaluates a number of factors and criteria including length and width of the vehicle to be towed, weight, wheel base, ground clearance, door clearance, and other physical characteristics, all to determine if the customer's tow vehicle can tow the truck rental company tow dollies and auto transports and further whether the customer's vehicle to be towed can be and should be towed on each potential tow dolly and auto transport. For example, the software analyzes the height of the customer vehicles and hitch assembly, length and width of the customer vehicles, electrical wiring harness, stabilizer bars, ground clearance, engine size, drive configuration, towing capacity, and other physical characteristics. The software evaluates weight ratios between the tow vehicle and the combination of the tow dolly or auto transport and vehicle to be towed. The weight ratio for tow dolly may be 1:1. The weight ratio for auto transport may be 1:1.25. A tow dolly weighing 700 lbs and vehicle to be towed weighing 3300 lbs will require the tow vehicle to be at least 4000 lbs. An auto transport weighing 2100 lbs and vehicle to be towed weighing 4150 lbs will require the tow vehicle to be at least 5000 lbs. The tow dolly may require at least a class II hitch while the auto transport requires a class III hitch. The wheel width must compared to the tow dolly and auto transport ramps to make sure that the vehicle can be safely loaded. The overall width of the vehicle to be towed is compared to the width of the tow dolly and auto transport to ensure compatibility. Thus, the physical characteristics of the customer tow vehicle and vehicle to be towed as retrieved from the central database are compared to the physical characteristics and requirements of the tow dolly and auto transport trailers also found in the central database to determine compatibility between the vehicles and the rental equipment.

Each tow dolly and auto transport has known compatibility ranges that are matched to the characteristics of the customer tow vehicle and vehicle to be towed. Using the comprehensive vehicle and trailer information from the central database, the software on computer 12 validates customer tow vehicle information and vehicle to be towed information, as provided from the customer vehicle towing customer vehicle webpage in FIG. 4, and matches to compatible tow dollies and auto transports available from the truck rental company. The rental tow dollies and auto transports trailers which have been identified as being compatible with the customer vehicles are sent to computer 26 over communication network 22, including description, size, capacity, and price, and displayed as a list on computer 26 for the customer to select from. The customer selects the tow dolly or auto transport from the list best suited to meet their needs and budget. In addition, the completed reservation information is sent to the local dealer for their records.

In addition, as discussed above, the truck rental company maintains a series of advisories and footnotes compiled from the day to day operations in the truck and trailer rental business. Certain vehicles are known to scrape bottom when loading onto the tow dolly. Other vehicles cannot open their doors without banging the sides when loaded on the auto transport. All potential and known problems, advisories, and notes are retrieved from the central database. The relevant advisories and footnotes are displayed in a pop-up window on computer 26 to disclose to the customer up front that there may be issues with the customer vehicles and rental equipment that may not be readily apparent. The customer clicks a confirmation box to acknowledge disclosure of the advisories and footnotes associated with renting the tow dolly or auto transport. This confirmation can be useful to limit liability if the customer calls in after the fact and complains about the bottom of their vehicle being scraped while loading on the tow dolly or their door being damaged by the auto transport. The customer was warned and confirmed the notice.

Even if vehicle to be towed otherwise passes muster in the evaluation and validation process, the truck rental company may have certain business rules based on prior experience that deny rental in certain situations. The truck rental company may have prior experience with SUVs that do not have a hard top and may have a policy based on safety and liability concerns against renting the tow dolly or auto transport for this type of vehicle.

Figure 5:
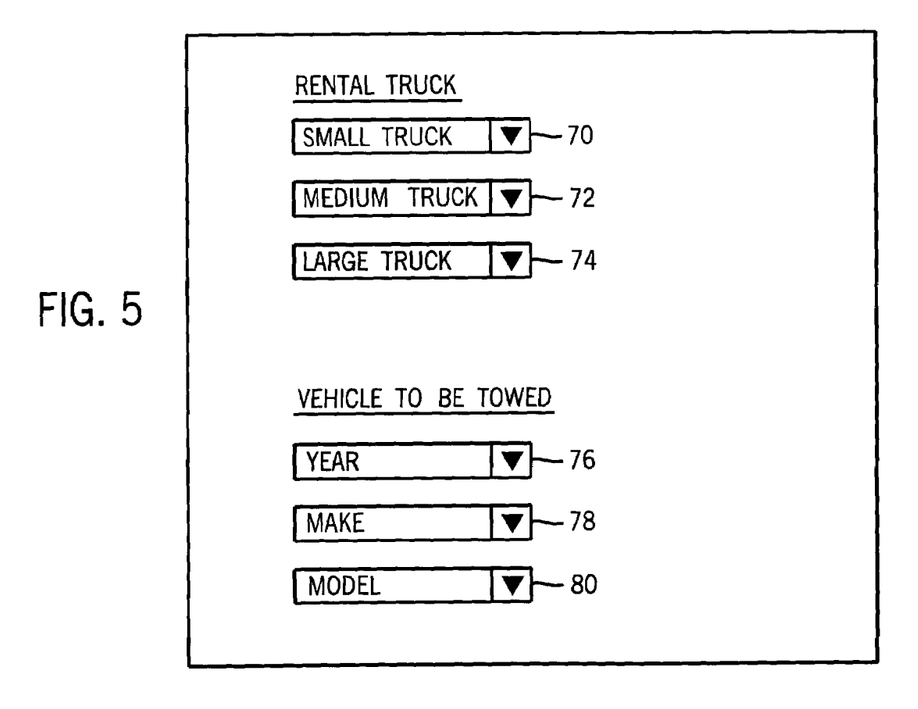
FIG. 5 illustrates a webpage for matching a rental truck towing a customer vehicle.

Selecting rental truck towing customer vehicle in box 38 displays a webpage, as shown in FIG. 5, where the customer selects a truck offered by the truck rental company and enters a basic vehicle description about the vehicle to be towed. The rental truck towing customer vehicle webpage provides small truck box 70, medium truck box 72, and large truck box 74 for the customer to select the desired rental truck. The webpage further provides pull-down windows for specifying year, make, and model of customer vehicle to be towed in boxes 76, 78, and 80, respectively. The vehicle information provided by the customer through the rental truck towing customer vehicle webpage is sent to computer 12 over communication network 22. The software running on computer 12 searches the database for the selected rental truck and customer vehicle to be towed. With the rental truck and customer vehicle information from the database, the software running on computer 12 conducts a search of the database looking for tow dollies or auto transports trailers that are compatible with the rental truck and customer vehicle to be towed.

The software on computer 12 evaluates similar factors and criteria, as described for customer vehicle towing customer vehicle webpage, to determine if the selected rental truck can tow the truck rental company tow dollies and auto transports and further whether the customer's vehicle to be towed can be and should be towed on each potential tow dolly and auto transport.

Each tow dolly and auto transport has known compatibility ranges that are matched to the physical characteristics of the rental truck and customer vehicle to be towed. Using the comprehensive vehicle and trailer information from the central database, the software on computer 12 validates rental truck tow information and customer vehicle to be towed information and matches to compatible tow dollies and auto transports available from the truck rental company. The compatible tow dollies and auto transports, including description, size, capacity, and price, are displayed as a list on computer 26 for the customer to select from. The truck rental company advisories and footnotes relevant to the customer vehicle to be towed, as discussed for the customer vehicle towing customer vehicle webpage, are also displayed. The customer selects the tow dolly or auto transport from the list best suited to meet their needs and budget. In addition, the completed reservation information is sent to the local dealer for their records.

Figure 6:
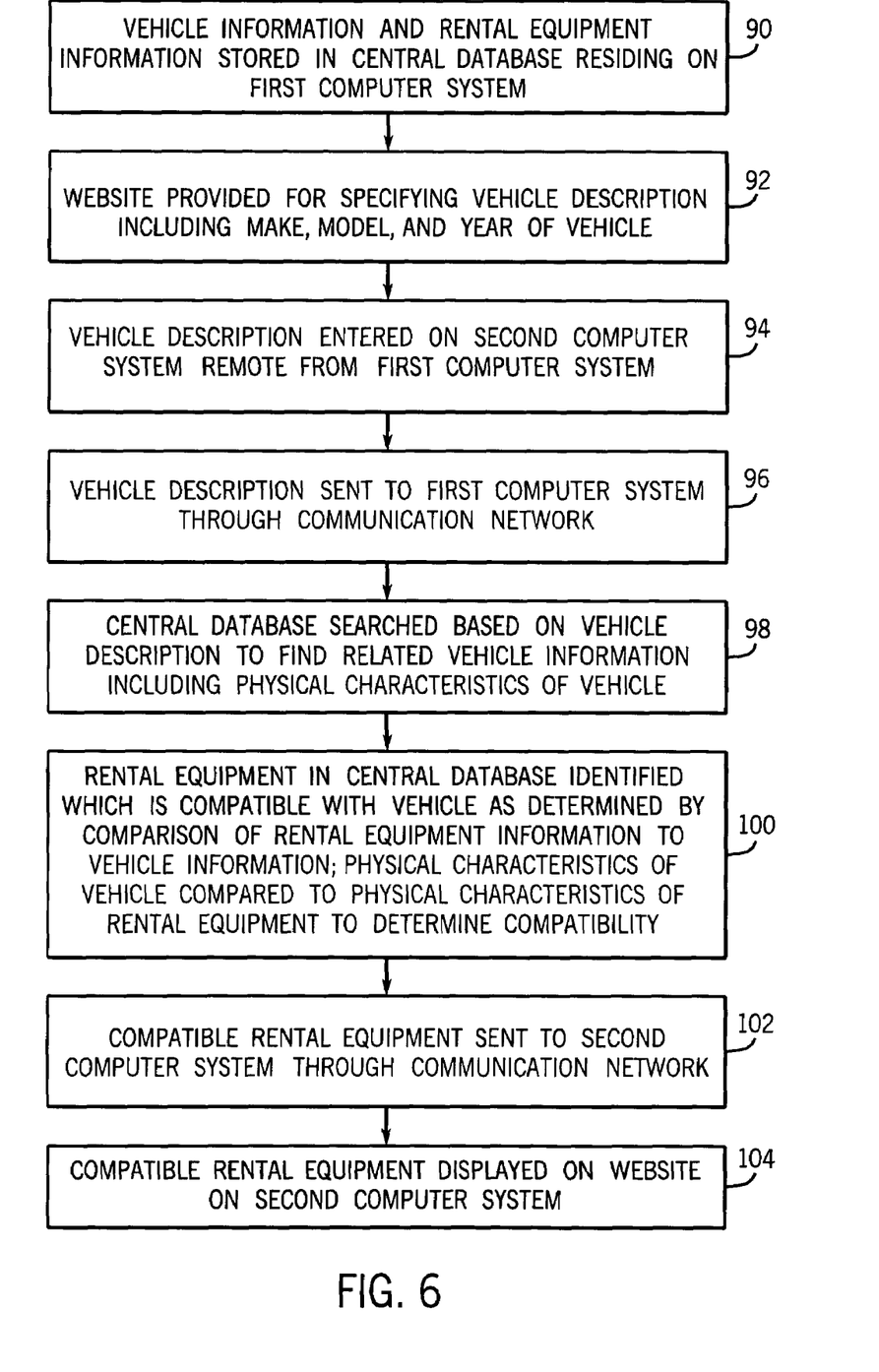
FIG. 6 illustrates the steps of matching vehicle ratings using a central database.

The steps of matching vehicle ratings using a central database is described in FIG. 6. In step 90, the vehicle information and rental equipment information are stored in a central database residing on a first computer system. In step 92, a website allows the user to specify vehicle description including make, model, and year of the vehicle. In step 94, the vehicle description is entered on a second computer system remote from the first computer system. In step 96, the vehicle description is sent to the first computer system through a communication network. In step 98, the central database is searched based on the vehicle description to find related vehicle information including physical characteristics of the vehicle. In step 100, the rental equipment in the central database is identified which is compatible with the vehicle as determined by comparison of the rental equipment information to the vehicle information. The physical characteristics of the vehicle are compared to the physical characteristics of the rental equipment to determine compatibility. In step 102, the compatible rental equipment is sent to the second computer system through the communication network. In step 102, the compatible rental equipment is displayed on the website on the second computer system.

A person skilled in the art will recognize that changes can be made in form and detail and equivalents may be substituted for elements of the invention without departing from the scope and spirit of the invention. The present description is therefore considered in all respects to be illustrative and not restrictive, the scope of the invention being determined by the following claims and their equivalents as supported by the above disclosure and drawings.

What is claimed is:

1. A computer-implemented method of matching vehicle ratings to rental equipment using a central database, comprising:

storing vehicle information and rental equipment information in the central database;

providing a website for a user to specify a description of a vehicle;

retrieving the vehicle information from the central database based on the description of the vehicle as specified by the user;

searching the central database based on the vehicle information retrieved from the central database to identify rental equipment in the central database which is compatible with the user-specified vehicle by a computer-implemented comparison of the rental equipment information to the vehicle information, wherein the computer implemented method selects the rental equipment based on compatible attributes between the rental equipment information and vehicle information, including height of the vehicle and hitch assembly, length and width of the vehicle, weight ratio, electrical wiring harness, ground clearance, engine size, drive configuration, wheel base, and towing capacity; and displaying the compatible rental equipment on the website.

2. The method of claim 1 wherein the description of the vehicle includes make, model, and year of the vehicle.

3. The method of claim 2 further including the step of providing a webpage to enter the make, model, and year of the vehicle.

4. The method of claim 1 wherein the vehicle information in the central database includes physical characteristics of the vehicle.

5. The method of claim 4 wherein the physical characteristics of the vehicle include height, width, length, weight, and ground clearance.

6. The method of claim 4 wherein the physical characteristics of the vehicle are compared to physical characteristics of the rental equipment to determine compatibility between the vehicle and the rental equipment.

7. The method of claim 1 wherein the central database resides on a first computer system.

8. The method of claim 7 further including:

entering the description of the vehicle on a second computer system remote from the first computer system;

sending the description of the vehicle to the first computer system through a communication network;

sending a listing of the compatible rental equipment to the second computer system through the communication network; and displaying the listing of the compatible rental equipment on the second computer system.

9. The method of claim 8 further including:

determining a need for additional information based on a search of the central database with the description of the vehicle; and requesting the additional information from a user operating the second computer system.

10. A computer-implemented method of matching vehicle information to equipment, comprising:

receiving a description of a vehicle from a user;

searching a central database based on the description of the vehicle to identify equipment in the central database which is compatible with the vehicle by a computer-implemented comparison of the equipment to the vehicle information, wherein the computer-implemented method selects the equipment based on compatible attributes between the equipment and vehicle information, including at least one attribute from the group consisting of height of the vehicle and hitch assembly, length and width of the vehicle, weight ratio, electrical wiring harness, ground clearance, engine size, drive configuration, wheel base, and towing capacity; and sending a listing of the compatible equipment to the user.

11. The method of claim 10 further including the step of storing vehicle information and equipment information on the central database.

12. The method of claim 10 further including the step of providing a website for the user to specify the description of the vehicle.

13. The method of claim 12 further including the step of displaying the compatible rental equipment on the website for the user.

14. The method of claim 10 wherein the description of the vehicle includes make, model, and year of the vehicle.

15. The method of claim 10 wherein the vehicle information in the central database includes physical characteristics of the vehicle.

16. The method of claim 15 wherein the physical characteristics of the vehicle include height, width, length, weight, and ground clearance.

17. The method of claim 15 wherein the physical characteristics of the vehicle are compared to physical characteristics of the equipment to determine compatibility between the vehicle and the equipment.

18. The method of claim 10 wherein the central database resides on a first computer system.

19. The method of claim 18 further including:

entering the description of the vehicle on a second computer system remote from the first computer system;

sending the description of the vehicle to the first computer system through a communication network;

sending a listing of the compatible equipment to the second computer system through the communication network; and displaying the listing of the compatible equipment on the second computer system.

20. The method of claim 19 further including:

determining a need for additional information based on a search of the central database with the description of the vehicle; and requesting the additional information from the user operating the second computer system.

21. A computer-implemented method of matching a vehicle with rental equipment, comprising:

storing vehicle information and rental equipment information in a central database;

receiving a description of a vehicle from a website;

retrieving the vehicle information from the central database based on the description of the vehicle;

searching the central database based on the vehicle information retrieved from the central database to identify rental equipment which is compatible with the vehicle by a computer-implemented comparison of the rental equipment information to the vehicle information, wherein the computer-implemented method selects the rental equipment based on compatible attributes between the rental equipment information and vehicle information; and displaying the compatible rental equipment on the website.

22. The method of claim 21 wherein the description of the vehicle includes make, model, and year of the vehicle.

23. The method of claim 21 wherein the vehicle information in the central database includes physical characteristics of the vehicle.

24. The method of claim 23 wherein the physical characteristics of the vehicle are compared to physical characteristics of the rental equipment to determine compatibility between the vehicle and the rental equipment.

25. A computer system, comprising:
   means for storing vehicle information and equipment information in a central database;
   means for providing a website;
   means for receiving a description of a vehicle;
   means for retrieving the vehicle information from the central database based on the description of the vehicle;
   means for searching the central database based on the vehicle information retrieved from the central database to identify rental equipment in the central database which is compatible with the vehicle as determined by a computer-implemented comparison of the rental equipment to the vehicle information, wherein the computer-implemented method selects the rental equipment based on compatible attributes between the rental equipment information and vehicle information; and
   means for displaying the compatible rental equipment on the website.

26. The computer system of claim 25 wherein the vehicle information in the central database includes physical characteristics of the vehicle.

27. The computer system of claim 26 wherein the physical characteristics of the vehicle are compared to physical characteristics of the rental equipment to determine compatibility between the vehicle and the rental equipment.

28. The computer system of claim 25 wherein the central database resides on a first computer system.

29. The computer system of claim 28 further including:
   means for entering the description of the vehicle on a second computer system remote from the first computer system;
   means for sending the description of the vehicle to the first computer system through a communication network;
   means for sending a listing of the compatible equipment to the second computer system through the communication network; and
   means for displaying the listing of the compatible equipment on the second computer system.

30. A mass storage device, comprising:
   means for storing vehicle information and equipment information in a central database;
   means for providing a website;
   means for receiving a description of a vehicle;
   means for retrieving the vehicle information from the central database based on the description of the vehicle;
   means for searching the central database based on the vehicle information retrieved from the central database to identify rental equipment in the central database which is compatible with the vehicle as determined by a computer-implemented comparison of the rental equipment to the vehicle information, wherein the computer-implemented method selects the rental equipment based on compatible attributes between the rental equipment information and vehicle information; and
   means for displaying the compatible rental equipment on the website.

31. The mass storage device of claim 30 wherein the vehicle information in the central database includes physical characteristics of the vehicle which are compared to physical characteristics of the rental equipment to determine compatibility between the vehicle and the rental equipment.

* * * * *